United States Patent [19]

Fujimoto et al.

[11] Patent Number: 4,770,864

[45] Date of Patent: Sep. 13, 1988

[54] PROCESS FOR REMOVING $NH_3$ IN AN $SO_2$-CONTAINING GAS

[75] Inventors: Takayuki Fujimoto; Osamu Matsunaga; Susumu Chawanya; Kouichi Shirai; Morito Okamura, all of Tochigi, Japan; Thierry Dupin, Garges/les/Gonesse, France

[73] Assignees: Mitsui Miike Eng. Corp., Tochigi, Japan; Rhone-Poulenc Specialties Chimiques, Courbevoie, France

[21] Appl. No.: 59,243

[22] Filed: Jun. 9, 1987

Related U.S. Application Data

[63] Continuation-in-part of Ser. No. 767,970, Aug. 21, 1985, abandoned.

[30] Foreign Application Priority Data

Aug. 30, 1984 [JP] Japan .................. 59-179449

[51] Int. Cl.⁴ .............................................. C01C 3/00
[52] U.S. Cl. .................................. 423/237; 423/244; 423/351; 423/563; 423/571

[58] Field of Search .......... 423/237, 563, 351, 244 R, 423/574 R

[56] References Cited

U.S. PATENT DOCUMENTS

| 2,887,363 | 5/1959 | Viles .............................. 423/574 G |
| 4,081,510 | 3/1978 | Kato et al. ........................ 423/237 |
| 4,117,101 | 9/1978 | Fechner et al. ................. 423/574 R |

FOREIGN PATENT DOCUMENTS

| 2646753 | 4/1977 | Fed. Rep. of Germany ...... 423/237 |
| 0023566 | 2/1977 | Japan ................................. 423/237 |
| 0058067 | 5/1977 | Japan ................................. 423/237 |

Primary Examiner—John Doll
Assistant Examiner—Lori S. Freeman
Attorney, Agent, or Firm—Wenderoth Lind & Ponack

[57] ABSTRACT

An $SO_2$-containing gas, in particular, pre-stage gas for the Claus reaction to recover sulfur can effectively be purified by removing $NH_3$ contained therein using a $TiO_2$ catalyst.

8 Claims, 2 Drawing Sheets

PROCESS FOR REMOVING NH₃ IN AN SO₂-CONTAINING GAS

This application is a continuation-in-part of now abandoned application Ser. No. 767,970, filed Aug. 21, 1985.

BACKGROUND OF THE INVENTION

1. Field of the Invention

This invention relates to a process for removing $NH_3$ in an $SO_2$-containing gas (acidic gas) and more particularly, it is concerned with a process for the removal of $NH_3$ from an $SO_2$-containing gas using a titanium-type catalyst.

2. Description of the Prior Art

Up to the present time, a thermal reaction method or catalyst method has hitherto been employed for the removal of $NH_3$. In this catalyst method, a catalyst using alumina as a support has generally been used. However, such a catalyst has not been put to practical use because of meeting with rapid deactivation due to poisonous sulfur compounds in an atmosphere in which $SO_2$ and $H_2O$ coexist. Therefore, the thermal reaction method should exclusively be used so as to remove $NH_3$ in an $SO_2$-containing gas.

As a process for treating an acidic gas containing $SO_2$, for example, there is a sulfur recovery process using the so-called Claus reaction. When this process is applied to an $SO_2$-containing gas with no $H_2S$ or with an $H_2S$ concentration of less than twice as much as $SO_2$, the $SO_2$-containing gas is firstly reduced by a reducing gas such as $H_2$, CO, etc. or a carbonaceous material to convert a part or all of $SO_2$ into sulfur compounds such as $H_2S$, COS, $CS_2$, etc. and sulfur vapor and then fed to a Claus unit. When the above described reducing reaction is carried out at a high temperature, e.g. 500° to 1000° C., however, several hundreds to several thousands ppm of $NH_3$ is formed and the prestage gas for the Claus reaction, containing $NH_3$ in such a high concentration, reacts with the acidic components such as $SO_2$, etc. in the Claus unit to form ammonium sulfate and ammonium hydrogen sulfate which will deposit in the unit and clog the unit since it is almost kept at a low temperature, e.g. 300° C. or lower, thus resulting in a serious prblem on the continuous operation. Before the present invention is developed, the removal of $NH_3$ from the pre-stage gas for the Claus reaction must have been carried out by the thermal reaction method.

On the termal reaction method, however, installation of a heating furnace is required and in the case of direct heating, the gas is diluted, while in the case of indirect heating, it is necessary to use an expensive heat resisting material for the installation. As described above, the thermal reaction method has the various problems, i.e. excessive consumption of energy, increase in cost and complication of the process.

SUMMARY OF THE INVENTION

It is an object of the present invention to provide a process for removing $NH_3$ in an $SO_2$-containing gas, whereby the above described problems of the prior art can be solved.

It is another object of the present invention to provide a process for the removal of $NH_3$ from the pre-stage gas for the Claus reaction in the sulfur recovery process using a Claus unit.

These objects can be attained by a process for removing $NH_3$ in an $SO_2$-containing gas, characterized by removing $NH_3$ from the $SO_2$-containing gas by a titanium-type catalyst.

BRIEF DESCRIPTION OF THE DRAWINGS

The accompanying drawings are to illustrate the principle and merits of the present invention in detail.

DETAILED DESCRIPTION OF THE INVENTION

Figure 1:
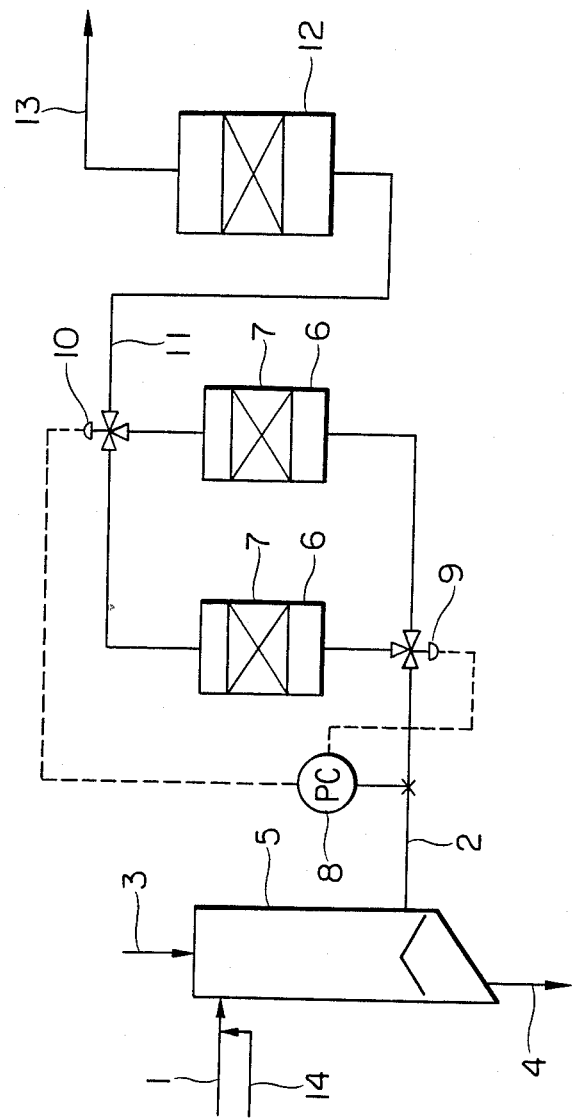
FIG. 1 is a flow diagram showing one embodiment of a process for removing $NH_3$ in a reduced gas when an $SO_2$-containing gas is recovered in a Claus unit, according to the present invention.

The inventors have made various efforts to solve the above described problems in the process for removing $NH_3$ in an $SO_2$-containing gas and consequently, have found that a titanium-type catalyst can be applied to the process for removing $NH_3$ in an $SO_2$-containing gas, and a means therefor.

In the process using a titanium catalyst according to the present invention, there is no deactivation due to sulfur compounds, but stable removal of $NH_3$ is possible. The process of the present invention can be applied, with meritorious effects, to removal of $NH_3$ in the prestage gas for the Claus reaction in a sulfur recovery process by a Claus unit. Accordingly, the present invention provides a process for removing $NH_3$ in an $SO_2$-containing gas, characterized by removing $NH_3$ from the $SO_2$-containing gas by a titanium-type catalyst.

The process of the present invention will be illustrated in greater detail.

The titanium-type catalyst of the present invention can be prepared by hydrolysing a titanium ore such as limenite or titanium tetrachloride to form titanium oxide, mixing with water or a binder, extruding the mixture, drying, calcining and optionally impregnating with verious chemicals. Catalysts using titanium oxides as a support or catalysts containing titanium oxides are known, for example, as disclosed in Japanese Patent Application OPI (Kokai) Nos. 24637, 24638/1982 248/1983 and 249/1983, which are incorporated by reference.

As the titanium-type catalyst of the present invention, it is preferable to use, for example, a titanium-type catalyst containing 60% by weight or more of $TiO_2$, preferably 60 to 99% by weight, preferably prepared for the Claus reaction, which can be prepared by the processes such as described in the above described publications. As the binder, there can preferably be used carboxymethyl cellulose and polyacrylamide.

In the process of the present invention, an $SO_2$ concentration of 0.5% by volume or more in the gas is preferable for holding the catalytic activity for a long time. The reaction temperature is preferably 500° to 800° C., since if lower than 500° C., the removal efficiency of $NH_3$ is decreased not so as to be useful, while the maximum value of the exhausting temperature of a feed gas from the previous stage is approximately 800°

C. and and even if higher than 800° C. there is no particular advantage, but poor economy. The space velocity (SV) is preferably 500 to 4000 $Hr^{-1}$, since even if less than 500 $Hr^{-1}$, increase of the removal efficiency of $NH_3$ cannot be expected, but there is only poor economy, while 4000 $Hr^{-1}$ is the minimum contact time required for removing $NH_3$.

The following experiment is carried out for the purpose of examining the relationship between the temperature of a catalyst layer and the $NH_3$ removal efficiency under the following conditions. A titanium-type catalyst is charged in a reactor equipped with a heating means and the compositions of a feed gas and exhaust gas are examined to obtain the removal efficiency of $NH_3$:

Catalyst Used: Catalyst I prepared by the following procedure
Volume of Catalyst Charged: 75 ml
Feed Gas:
  $SO_2$ 0-10 vol %
  $NH_3$ 1000-3000 ppm
  $N_2$, $H_2O$, $CO_2$, $O_2$, etc.

Preparation of Catalyst (I)

Titanium tetrachloride is hydrolysed to obtain a suspension which is then subjected to decantation and filtered, and the solid product is dried at 110° C. for 24 hours to obtain a powder. This powder is mixed according to the following recipe:

| | |
|---|---|
| Powder | 66% |
| Water | 32% |
| Carboxymethyl Cellulose | 2% |

The above described mixture is kneaded for 30 minutes, extruded and formed through a die of 3 mm, dried for 8 hours at 110° C. and calcined at 450° C. for 2 hours. 1 kg of the product is impregnated with 310 ml of a solution of ammonium sulfate to give an $SO_4/TiO_2$ weight ratio of 0.06 and dried at 100° C. for 4 hours.

The dried product is impregnated with 300 ml of calcium nitrate solution to give a $Ca/TiO_2$ weight ratio of 0.025, dried at 110° C. for 12 hours and then calcined at 450° C. for 1 hour to obtain Catalyst (I).

Figure 2:
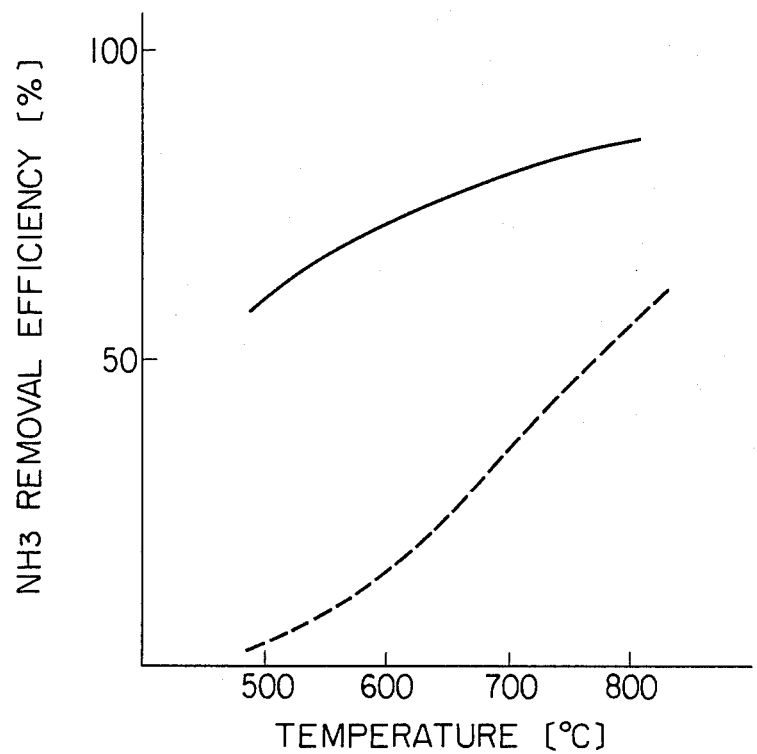
FIG. 2 is a graph showing one example of the relationship between the reaction temperature and $NH_3$ removal efficiency in the process of the present invention.

The results are shown by a graph (solid line) in FIG. 2 in which the abscissa represents the reaction temperature (°C.) and the ordinate represents the $NH_3$ removal efficiency (%). For comparison, $NH_3$ removal is carried out under the same conditions but using no catalyst, thus obtaining results shown by a chain line in FIG. 2.

A preferred embodiment of the present invention will be illustrated when the process of the present invention is applied to recovery of sulfur from an $SO_2$-containing gas using a Claus unit.

FIG. 1 is a flow diagram showing one embodiment of the process of the present invention, which comprises feed pipe 1 of an $SO_2$-containing gas, reduced gas pipe 2, reducing agent 3, discharged reducing agent 4, reducing furnace 5, $NH_3$ reactor 6, titanium-type catalyst 7 filled in $NH_3$ reactor 6, pressure controller 8, controlling means 9 and 10 of $NH_3$ catalytic reactor 6, feed gas pipe 11 to Claus unit 12, Claus unit 12, tail gas pipe 13 and air or oxygen 14.

A raw gas containing $SO_2$ is mixed with air or oxygen 14, fed to reducing furnace 5 via feed pipe 1 and reacted with reducing agent 3 (carbonaceous material in this case) in reducing furnace 5, whereby a part of $SO_2$ in the raw gas is reduced to $H_2S$, etc. The reducing agent containing ash and the like after the reaction is processed as discharged reducing agent 4.

The reduced gas formed in reducing furnace 5 is fed to $NH_3$ catalytic reactor 6 via reduced gas pipe 2 and passed through catalyst layer 7 to remove $NH_3$. The reaction formula to remove $NH_3$ during the same time is as follows:

$$4NH_3 + 3SO_2 \rightarrow 3S + 6H_2O + 2N_2$$

Ordinarily, one or more catalytic reactors are provided. FIG. 1 shows a case of providing two reactors. Two catalytic reactors 6 are alternatively used by changing one by one using controlling means 9 and 10. Thus, clogging of catalyst layers 7 by the reduced gas containing dust, formed in reducing furnace 5, can be prevented. Change of catalyst layers 7 is carried out by observing the pressure in catalytic reactor 6 by pressure controller 8 and allowing controlling means 9 to operate when the pressure is increased, during which catalyst layer 7 under clogged state is backwashed to remove the dust. When using a reducing agent forming no dust, for example, a gaseous reducing agent such as hydrogen, or using a catalyst formed in a cylindrical or honey-comb shape so as to be suited for dust-containing gases, one catalytic reactor is sufficient and accordingly, the changing operation is not required.

The thus $NH_3$ removed gas is fed to Claus unit 12 as Claus feed gas 11, in which the gas is subjected to recovery of sulfur and from which the gas is fed to a next step as a tail gas.

The following examples are given in order to illustrate the present invention in detail without limiting the same.

EXAMPLES 1-5

In a system as shown in FIG. 1, coke was used as reducing agent 3 in reducing furnace 5 and the resulting $SO_2$-containing gas (reduced gas) was treated by $NH_3$ catalytic reactor 6 under gaseous conditions and catalytic reaction conditions in common with Examples 1-5. The gaseous composition is represented by % by volume.

| Reduced Gas Composition | |
|---|---|
| $H_2S$ 4.8-5.0% | $CO_2$ 6-8.2% |
| $SO_2$ 2.6-2.8% | $O_2$ 0.3-0.5% |
| COS 1.3-1.5% | $S_2$ 2-3% |
| $H_2O$ 5-2.0% | $N_2$ balance |
| $NH_3$ 1500-2000 ppm | dust 2.5-3.5 g/$Nm^3$ |
| Reducing Conditions | |
| Temperature | 650-750° C. |
| Flow Rate | 30-32 $Nm^3$/hr |
| $NH_3$ Catalytic Reaction Conditions | |
| SV | 800 $Hr^{-1}$ |
| Temperature | 600-700° C. |
| Catalyst | Catalysts (I) - (V) |
| Operation Time | 500 Hr |

Catalyst (I) was prepared as described above and the results were that the $NH_3$ concentration of the processed gas at the outlet was 100 to 500 ppm ($NH_3$ removal efficiency: 70 to 90%) and there were found no precipitation of ammonium sulfate, nor lowering of the catalytic activity.

Catalyst (II) to (V) were prepared by the following procedure and substantially the similar results were obtained.

Preparation of Catalysts

Catalyst (II)

A titanium ore is subjected to a treatment with sulfuric acid, hydrolysed and filtered to obtain a titanium oxide suspension, which is then heated and dried by passing through a heat exchanger.

The resulting product is mixed by the following recipe:

| Product | 69% |
|---|---|
| Water | 30.8% |
| Polyacrylamide | 0.2% |

This mixture is kneaded for 20 minutes, extruded and formed through a die of 5 mm in diameter, dried at 110° C. for 24 hours and then calcined at 350° C. in the air for 2 hours by means of an electric furnace.

Catalyst (III)

A titanium ore is subjected to a treatment with sulfuric acid, hydrolysed and filtered to obtain a titanium oxide suspension which is then heated. The resulting powder is mixed and kneaded with water, polyacrylamide and metatungstic acid for 40 minutes, extruded and formed through a die of 3 mm, dried at 110° C. for 24 hours and calcined at 500° C. for 2 hours.

Catalyst (IV)

A titanium ore is subjected to a treatment with sulfuric acid, hydrolysed and filtered to obtain a titanium oxide suspension, which is then dried at 180° C. for 1 hour to obtain a powder.

This powder is mixed according to the following recipe:

| Powder | 64% |
|---|---|
| Barium Nitrate | 8% |
| Water | 28% |

This mixture is kneaded for 2.5 hours, extruded and formed through a die of 5 mm, dried at 110° C. for 4 hours and then calcined at 500° C. for 1 hour.

Catalyst (V)

A titanium ore (ilmenite) is subjected to a treatment with sulfuric acid, hydrolysed and filtered to obtain a titanium oxide suspension, to which calcium nitrate is added in such a manner that the calcium nitrate is reacted with all the sulfate ions to give a Ca/TiO$_2$ weight ratio is 0.033. This suspension is dried at 150° C. for 1 hour to obtain a powder. This powder is mixed according to the following recipe:

| Powder | 74% |
|---|---|
| Water | 26% |

This mixture is kneaded for 2 hours, extruded and formed through a die of 4 mm, dried at 110° C. for 4 hours and then calcined at 400° C. for 2 hours.

The resulting product is impregnated with a solution of metatungstic acid, dried at 150° C. for 4 hours, then impregnated with a solution of neodymium acetate/praseodymium acetate, dried at 150° C. for 4 hours and then calcined at 450° C. for 2 hours.

Comparative Example

Figure 3:
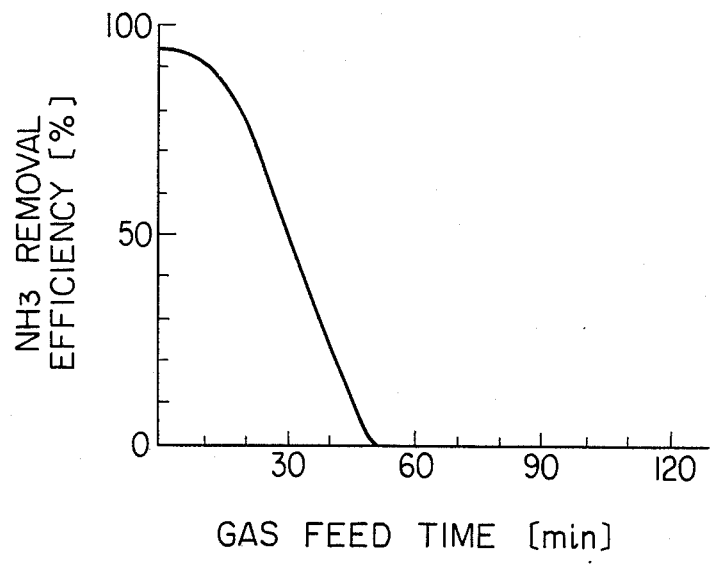
FIG. 3 is a graph showing one example of the relationship between the gas feed time and deactivation of the $NH_3$ removal capacity of an alumina support catalyst for comparison.

The procedure of Example 1 was repeated except using an alumina support catalyst in place of the catalyst of Example 1. The relationship of the gas feed time (min) vs the NH$_3$ removal efficiency at that time was as shown in FIG. 3. As evident from FIG. 3, the catalyst was deactivated by the operation in less than 1 hour and NH$_3$ with the same concentration as at the inlet was discharged. This was due to the permanent poisoning of the alumina support catalyst with sulfur compounds and accordingly, regeneration of the catalyst was impossible.

Catalyst Used:
　Support: alumina
　Supported One: nickel

What is claimed is:

1. In a process for removing NH$_3$ in a pre-stage gas for a Claus reaction in a sulfur-recovery process by a Claus unit, the improvement wherein the pre-stage gas containing 0.5% or more by volume of SO$_2$ and H$_2$S and 100 to 5,000 ppm of NH$_3$ is contacted with a catalyst consisting essentially of titanium at a temperature of 500° to 800° C.

2. The process of claim 1 in which the volume of SO$_2$ is 0.5 to 15% and the volume of H$_2$S is 4.8–5.0%.

3. The process of claim 1, wherein the pre-stage gas for the Claus reaction is obtained by reducing a part of an SO$_2$-containing gas in a reducing furnace by a reducing agent.

4. The process of claim 3, wherein the reducing agent is a carbonaceous material.

5. The process of claim 1, wherein the titanium-type catalyst contains at least 60% by weight of TiO$_2$.

6. The process of claim 1, wherein the titanium-type catalyst is prepared so as to be suited for the Claus reaction.

7. The process of claim 1, wherein the titanium-type catalyst is prepared by hydrolysing a titanium ore or titanium tetrachloride to form titanium oxide, mixing the titanium oxide with water and a binder, extruding and forming the mixture, drying and calcining.

8. The process of claim 1, wherein the removing of NH$_3$ is carried out at a temperature of 500° to 800° C. and a space velocity of 500 to 4000 hr$^{-1}$.

* * * * *